United States Patent [19]

Begg

[11] 4,040,640
[45] Aug. 9, 1977

[54] VEHICLE CHASSIS

[75] Inventor: John Robert William Begg, Adlington, near Chorley, England

[73] Assignee: British Leyland UK Limited, London, England

[21] Appl. No.: 672,242

[22] Filed: Mar. 31, 1976

[30] Foreign Application Priority Data

Apr. 26, 1975 United Kingdom ............... 17418/75

[51] Int. Cl.² ............................................. B62D 21/02
[52] U.S. Cl. ................................ 280/106 R; 296/28 F
[58] Field of Search ................. 280/106 R; 296/28 R, 296/28 F

[56] References Cited

U.S. PATENT DOCUMENTS

| 2,072,044 | 2/1937 | Widman | 280/106 R |
| 2,074,158 | 3/1937 | Alery | 280/106 R |
| 2,794,650 | 6/1957 | Schilberg | 280/106 R |
| 3,279,816 | 10/1966 | Issigonis | 280/106 R |

Primary Examiner—Philip Goodman
Attorney, Agent, or Firm—Brisebois & Kruger

[57] ABSTRACT

A ladder type chassis for a truck is made up of two sub-frames, each comprising two parallel channel-sectioned members interconnected by cross-members, the channel-sectioned members of the first sub-frame facing outwardly to form a wider engine bay than would be the case with conventional inward facing channel-sectioned chassis members.

2 Claims, 14 Drawing Figures

VEHICLE CHASSIS

The present invention relates to vehicle chassis and more particularly to the chassis of commercial vehicles.

One common known form of truck chassis comprises two mutually parallel channel sectioned steel members which are interconnected by transversely extending cross-members. This construction has the advantage of simplicity but constraints imposed on the relatively narrow spacing of the channel members at the rear of the chassis, due to the fitting for example of double wheels on the rear axle or axles, results in a limitation being imposed on the size of engine and its associated equipment which can be accommodated at the front of the chassis.

A second known construction of truck chassis is the socalled "cranked frame" type where the aforementioned mutually parallel channel sectioned members have a relatively narrow spacing at the rear of the chassis but are splayed outwardly or cranked between the rear and front wheels of the truck and then extend mutually parallel again to form a wider engine "bay". This construction has the disadvantage of being expensive to construct and in addition any cranking of the longitudinal channel members weakens their resistance to bending loads in the longitudinal direction; in addition the corners of the cranked ends act as vibration nodes and can therefore cause marked resonant frequencies, poor ride characteristics and high localised stresses.

A third known construction of truck chassis utilises a so-called "profiled cranked frame". In this construction the longitudinal members are not only cranked as in the second known construction above but they vary in cross-section along their lengths to suit the loading and to economise on material. This construction has the disadvantages of the second known construction described above and in addition is difficult to reinforce by so-called "flitching", ie. securing a contoured reinforcing plate against a section or portion of the frame.

The present invention is concerned with providing a motor vehicle chassis frame which overcomes the above disadvantages to a substantial extent and yet is simple and economical to manufacture.

1. According to the present invention a motor vehicle chassis frame comprises:
   a. a first pair of mutually parallel channel sectioned members interconnected by transverse cross-members to form a first sub-frame, the flanges of the channel sectioned members facing outwardly away from one another;
   b. a second pair of mutually parallel channel sectioned members interconnected by transverse cross-members to form a second sub-frame, the flanges of the channel sectioned members facing inwardly towards one another;
   c. one of the ends of each of the two channel members of the first pair overlying and abutting one of the ends of each of the two channel members of the second pair so that the distance between the channel members of the first pair is greater than that between those of the second pair;
   d. means securing the said overlying ends of the said first pair to the said ends of the second pair of channel sectioned members.

2. According to the present invention a method of manufacturing a truck having a chassis comprises the steps of:
   a. assembling first and second sub-frames separately, the sub-frames having the constructions defined in paragraph 1) above;
   b. mounting an engine and its ancilliary equipment and a driver's cab on the first sub-frame together with a front axle with steerable wheels;
   c. mounting a rear axle or axles on the second sub-frame either simultaneously with operation b) or before or after it; and
   d. connecting the two sub-frames together to form a complete chassis and truck.

How the invention may be carried out will now be described with reference to the following drawings in which.

Figure 1:
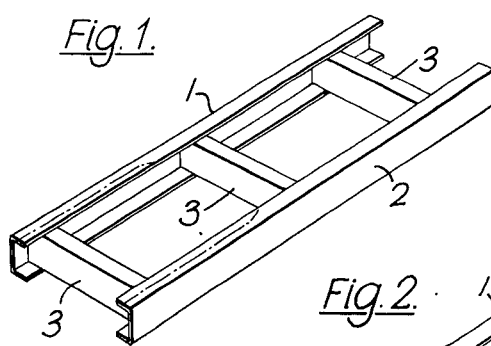
FIG. 1 is a diagrammatic representation of a first known type of truck chassis frame.

As indicated earlier a first known type of truck chassis, shown in FIG. 1, comprises mutually parallel channel sectioned members 1 and 2 which are interconnected by a number of cross-members 3 to form a so-called "ladder" type frame. The distance between the longitudinal channel sectioned members 1 and 2 is in practice dictated by the space which is available between the two twin rear wheels on the rear axle of the truck and this distance is typically about 34 inches, ie. the distance measured between the outside surfaces of the two channel sectioned members 1 and 2. This in turn means that the internal distance between the two channel sectioned members is approximately several inches less. The engine of the truck would normally be mounted between the front ends of the two channel sectioned members 1 and 2 and consequently the distance between these channel sectioned members dictates to a large extent the size of the engine which can be fitted. Therefore whilst the construction of chassis frame shown in FIG. 1 is simple and cheap to manufacture it does in practice impose limitations on the size of engine which can be fitted to the vehicle.

Figure 2:
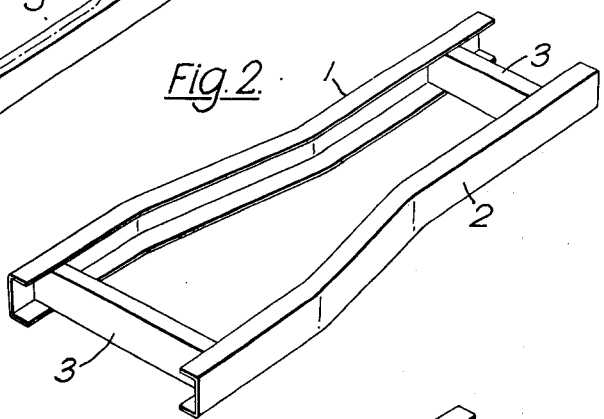
FIG. 2 is a similar view to FIG. 1 of a second known type of truck chassis frame.

In order to meet this problem it is also known to crank the front ends of the chassis members 1 and 2 outwardly as shown in FIG. 2 in order to provide a wider space within which to fit the truck engine. Whilst this arrangement enables larger engines to be fitted it has the disadvantage that the cranking of the chassis frames increase the cost of manufacturing it and also tends to introduce weaknesses into the chassis frame, as mentioned earlier. It is also often necessary to reinforce the longitudinal chassis members 1 and 2 by so-called "flitches", which reinforcements have to be contoured to fit the cranked portions of the two members 1 and 2. Consequently, any errors in manufacturing will result in it being either difficult to secure the "flitches" to the members 1 and 2, or if they are secured to it will result in a stress being built into the members 1 and 2.

Figure 3:
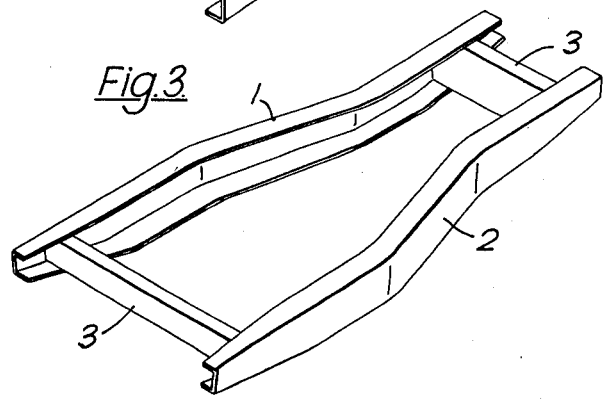
FIG. 3 is a similar view to FIG. 1 of a third known type of truck chassis frame.

With the two known constructions of chassis frame already described there is a certain amount of wasted material because although the loading on the chassis frame varies along its length the section of the longitudinal channel sectioned members 1 and 2 is constant, ie., there will be surplus material on for example the two ends of the members 1 and 2. In order to deal with this point a third known type of chassis frame is "profiled" (FIG. 3) in order to give a variable cross-section to the members 1 and 2 along their lengths to substantially match the loading which is met along the lengths of these two members. The longitudinal channel sectioned members 1 and 2 of this third known construction are cranked in the same way as the example of FIG. 2 in order to give a wider space or "bay" at their front ends for accommodating larger engines. Consequently, this construction also suffers the disadvantages of the chassis frame of FIG. 2 and in addition is even more expensive to manufacture because of the varying cross-sections of the longitudinal members 1 and 2.

Figure 4:
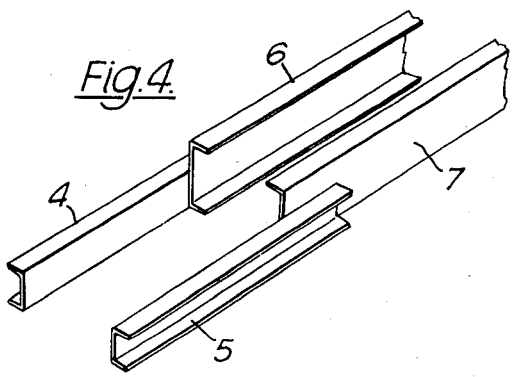
FIG. 4 is a view similar to FIG. 1 showing part of a chassis frame constructed according to the present invention.
Figure 5:
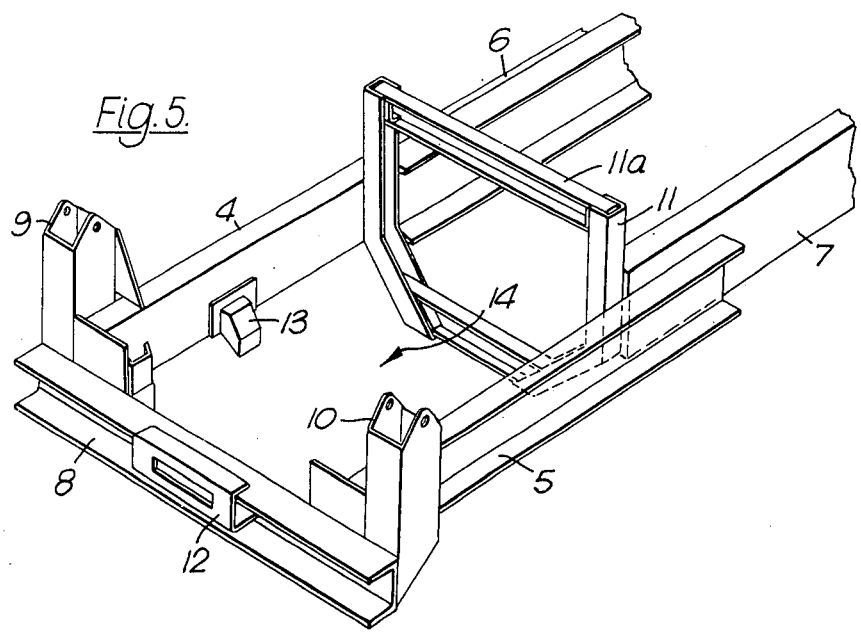
FIG. 5 is an enlarged fragmentary view showing in more detail a particular construction of chassis frame constructed according to the present invention.
Figure 6:
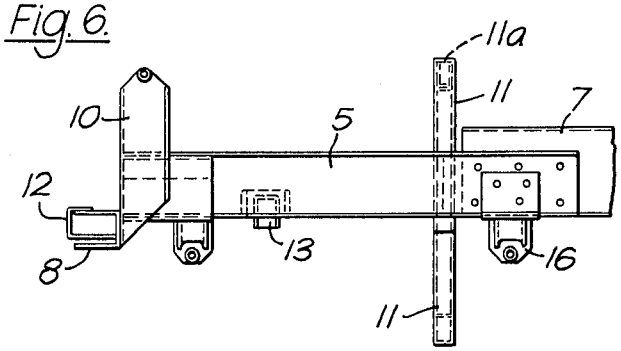
FIG. 6 is a side elevational view of FIG. 5.
Figure 7:
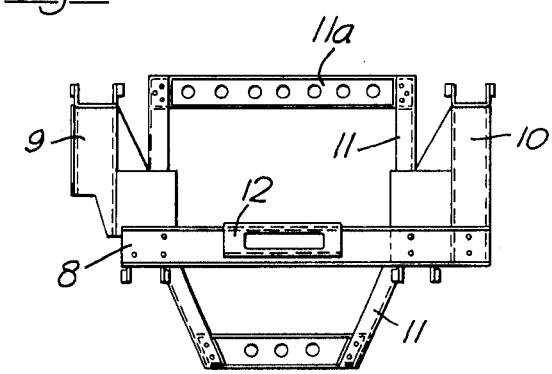
FIG. 7 is a front view of FIG. 5.
Figure 8:
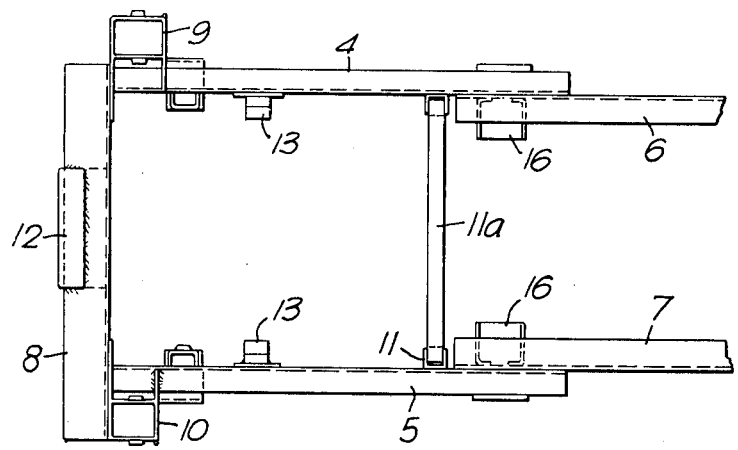
FIG. 8 is a plan view of FIG. 5.

A chassis frame according to the present invention is shown diagrammatically in FIG. 4 and comprises a first pair of mutually parallel sectioned members 4 and 5 which face outwardly with respect to one another and a second pair of mutually parallel channel sectioned members 6 and 7 which face inwardly with respect to one another. The channel sectioned members 4 and 5 are interconnected by cross-members which have been omitted from the drawing for clarity but are described and shown in some detail in FIGS. 5–8. Similarly the second pair of channel sectioned members 6 and 7 are in practice interconnected by cross-members which are not shown, the various cross-members being equivalent to those shown at 3 in FIGS. 1 to 3.

The two members 4 and 5 overlie and abut the two members 6 and 7 as shown and are secured to them by, for example, rivets, welding or special connectors which are described later.

With this arrangement it will be seen that the chassis comprises essentially two sub-frames, the first based on the members 4 and 5 and the second based on the members 6 and 7. Furthermore, by having the members 4 and 5 overlying the members 6 and 7 and facing outwardly, the internal spacing of the members 4 and 5 is greater than that of the members 6 and 7 thus provides a larger engine bay than would otherwise be the case. Furthermore, by having two sub-frames the sections of the members 4 and 5 on the one hand and the members 6 and 7 on the other, can be selected to match the loadings imposed on them and in practice this means that the members 4 and 5 can be constructed of smaller section than the members 6 and 7, thus saving material.

The front sub-frame will now be described in more detail, with reference to FIGS. 5 – 8.

The sub-frame comprises six major components, namely a so-called "pintle" cross-member 8, a left-hand channel sectioned side member 4, a right-hand channel sections side member 5, a left-hand corner bracket 9, a right-hand corner bracket 10 and a ring member generally indicated by 11 which also acts as the second or rear cross-member for the sub-frame. These various members can be secured together by any appropriate means such as rivetting or bolting or by special fasteners which are described later.

The cross-member 8 is of rectangular channel section and is reinforced by a smaller channel sectioned member 12. The cross-member 8 together with reinforcement 12 are constructed to be suitable for towing purposes.

The two side members are also of rectangular or prismatic channel section which is constant throughout their lengths, the depth of the channel section being chosen to withstand the bending moment and loads applied along their lengths. The thickness of these channel sections would be chosen to provide adequate strength at the various joints in the sub-frame. Engine mounting brackets 13, gearbox mounting brackets 16 and other mounting brackets (not shown) for hydraulic piping and electrical wiring, for example, are also carried by the members 4 and 5. Again these brackets can be secured in position by any of the suitable means referred to earlier.

Figure 9:
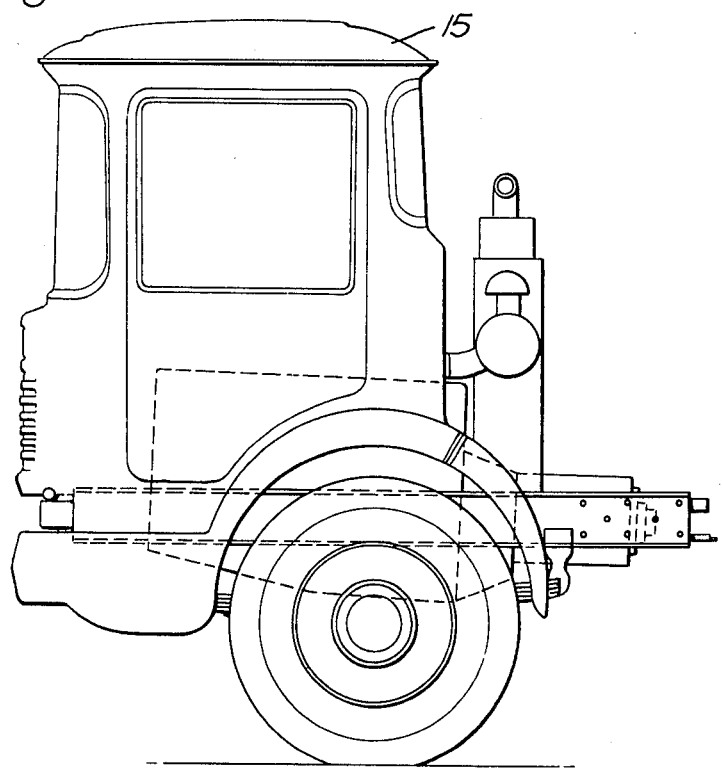
FIG. 9 shows a front end module of a truck based on the front part of the chassis frame shown in FIGS. 5 14 8.

The corner brackets 9 and 10 incorporate cab mounting brackets, spring hanger brackets and steering box supports and they form the joint between the side member 4 and 5 and the front cross-member 8. The ring member 11 is designed to accommodate a gearbox secured to the rear of the truck's engine (not shown), the engine being adapted to fit into the engine bay generally indicated by the arrow 14. The ring member 11 has a detachable top section 11a) to facilitate the removal of the engine/gearbox unit without first having to remove the driver's cab 15 (FIG. 9). In addition the ring member 11 may also support a gantry for the header tank for the engine cooling system. The ring member 11 may be a welded and/or bolted fabrication of cold formed channel sections.

The rear end of the truck chassis, ie., the second sub-frame is made up of the two longitudinal channel sectioned members 6 and 7 which are interconnected by the usual cross-members, the number of which would depend upon the type of chassis.

Figure 10A:
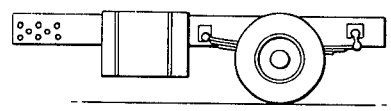
FIG. 10 (a, b, c, d, e) shows five rear end sub-frame assemblies based on the present invention.
Figure 10B:
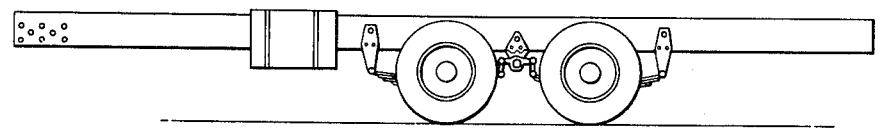
Figure 10C:
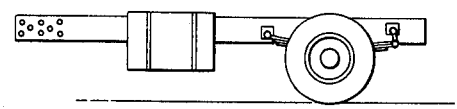
Figure 10D:
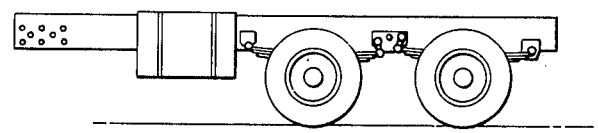
Figure 10E:
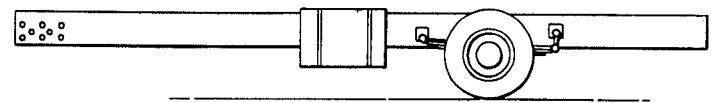

FIGS. 10a)–10e) show different examples of rear sub-frame assembly fitted with the appropriate rear axle or axles and suspensions to suit a 4 × 2 tractor for a tractor semi-trailer combination (FIG. 10a), a 6 × 4 long wheel base rigid truck (10b), a 4 × 2 short wheel base tipper truck (10c), a 6 × 4 long wheel base tipper truck (10d) and a 4 × 2 long wheel base rigid truck (10e).

It will thus be seen that the chassis frame constructed according to the present invention has the advantage of allowing a truck to be built in two separate assemblies or modules, the front axle and driver's cab as shown in FIG. 9 being common to a number of types and length of truck. This in turn means that the known production lines can be made shorter because they can in effect be split into two, the front module being made on one line and the rear module being made on another line or lines, the front and rear modules being brought together in the final step of assembly when the two sub-frames are secured to one another in the manner already described and shown with reference to FIGS. 4 and 5.

As indicated earlier the front and rear sub-frames can be secured together by any suitable means such as welding, bolting or rivetting. However, it has been found in practice that probably the best means for securing the two sub-frames together is by using connectors which are known by the trade names "HUCK" or "AVDEL". These comprise essentially a collar which is plastically deformed into a ridged portion of a high tensile bolt-like member, the final tension being determined by the failure or fracturing of a necked part of the bolt-like member. These fasteners are secured in position by specially designed tools or guns.

It has been found that this method of securing the two sub-frames together is more consistent that the use of threaded bolts where the bolt tension is dependent on the coefficient of friction. It is also preferable to rivetted or welded connections since with the latter is is more difficult to effect any repairs which necessitate disconnecting the front sub-frame from the rear sub-frame. In addition, from the production point of view the HUCK or AVDEL type of fastening is preferable since it is easier and quicker in securing the sub-frames together. This method of connection can also be used to secure the various components, such as the engine and suspension mountings, etc. to the sub-frames.

A further advantage of having the chassis made in two sections is that accident damage to one section would not necessitate scrapping the whole chassis since the damaged end could simply be detached from the undamaged end and replaced. Furthermore, because straight channel sectioned members are used for the chassis as a whole, it is easy to reinforce any required sections by flitching, and yet at the same time it is also possible to some extent to tailor the sections of the chassis to suit the loading.

I claim:

1. A motor vehicle chassis frame which comprises:
   a. a first pair of mutually parallel channel-sectioned members and a plurality of transverse cross-members, means connecting the said first pair to the cross-members to form a first sub-frame, the flanges of the channel-sectioned members facing outwardly away from one another;
   b. a second pair of mutually parallel channel-sectioned members and a plurality of transverse cross-members, means connecting the said second pair to the cross-members to form a second sub-frame, the flanges of the channel-sectioned members facing inwardly towards one another;
   c. one of the ends of each of the two channel members of the first pair overlapping and abutting one of the ends of each of the two channel members of the second pair on the outside thereof so that the distance between the channel members of the first pair is greater than that between those of the second pair; and
   d. means securing the said overlying ends of the said first pair to the said ends of the second pair of channel sectioned members.

2. A method of manufacturing a truck having a chassis frame including
   a. a first pair of mutually parallel channel-sectioned members, a plurality of transverse cross-members, and means connecting the said first pair of channel-sectioned members to the cross-members to form a first sub-frame, with the flanges of the channel-sectioned members facing outwardly away from one another;
   b. a second pair of mutually parallel channel-sectioned members, a plurality of transverse cross-members, and means connecting the said second pair of channel-sectioned members to the cross-members to form a second sub-frame, with the flanges of the channel-sectioned members facing inwardly toward one another,
   and in which one of the ends of each of the two channel-sectioned members of the first pair overlaps and abuts one of the ends of each of the two channel-sectioned members of the second pair, so that the distance between the channel-sectioned members of the first pair is greater than that between those of the second pair;
   said method comprising the steps of:
   c. mounting an engine and its ancillary equipment and a driver's cab on the first sub-frame, together with a front axle with steerable wheels;
   d. mounting at least one rear axle on the second sub-frame; and
   e. connecting the two sub-frames together to form a truck.

* * * * *